INVENTOR
HAROLD E. TREKELL
BY
ATTORNEY

Sept. 20, 1971    H. E. TREKELL    3,605,500
PRESSURE TRANSDUCER

Filed Oct. 27, 1969    2 Sheets-Sheet 2

INVENTOR
HAROLD E. TREKELL
BY
George A. Herbster
ATTORNEY 3,605,500
PRESSURE TRANSDUCER
Harold E. Trekell, Wakefield, Mass., assignor to
General Electric Company
Filed Oct. 27, 1969, Ser. No. 869,739
Int. Cl. G01l 9/00, 7/04
U.S. Cl. 73—398R                           9 Claims

ABSTRACT OF THE DISCLOSURE

A pressure transducer using a Bourdon tube producing an output signal variable with input pressure. Measurement errors due to nonlinear elastic properties of the tube are largely eliminated by imposing lateral and rotary restraints on the deflection end of the tube with a force balance lever system. Stops limit movement of the lever system beyond the normal measurement range and thus prevent excessive deflection and stress of the tube in the event of overpressure. Differential or absolute pressure may be conveniently measured by the addition of a second Bourdon tube connected in opposed relation to the first tube.

BACKGROUND OF THE INVENTION

The present invention relates to pressure transducers that produce an output signal variable in accordance with the magnitude of the input pressure or pressures for indication, recording or control purposes. While the invention has general application, it is particularly useful in pressure transducers used in control systems for measuring or controlling pressures or pressure differentials in industrial processes.

Pressure measuring devices, particularly those used in measuring high pressures i.e. pressures exceeding 100 p.s.i., often use Bourdon tubes as the pressure sensitive element. The tube, which is in a curved or coiled form, tends to unwind when subjected to pressure causing deflection of the free end. The deflection is measured and provides an indication of pressure. In such devices, the amount of deflection depends not only on the measured pressure which produces an unwinding torque but also on the spring or elastic action of the coiled tube which provides an opposing balancing torque. The elastic properties of the tube tend to become nonlinear with deflection stress and this causes errors in the pressure measurement. Also, if the device is exposed to a pressure substantially in excess of its rated value, the resulting stress may exceed the elastic limit of the material and cause a set in the tube which changes the zero point and calibration of the instrument. To prevent this, if is often necessary to provide an overpressure valve or other device to protect the tube from overpressure thus adding expense and complication.

Accordingly, it is an object of the present invention to provide a pressure transducer using a Bourdon tube as a pressure sensitive element, which largely avoids measurement errors caused by deflection stress and resulting changes in the elastic properties of the tube.

A further object of the invention is to provide a pressure transducer that will not experience a change in calibration, span or zero point when subjected to a substantial amount of overpressure.

A still further object of the invention is to provide a pressure measuring device which is more compact and has a higher degree of accuracy and repeatability in the performance of its measurement function than has been possible heretofore.

Further objects and advantages of the invention will become apparent as the following description proceeds.

SUMMARY

Briefly, in accordance with the present invention, the pressure transducer comprises a coiled Bourdon tube which experiences an unwinding torque variable with the measured pressure. To prevent errors caused by change in elastic properties of the tube due to deflection stress, movement of the deflection end of the tube is restrained. Rotary movement of the deflection end as a result of the unwinding pressure torque is opposed by a counter-torque supplied by a force motor through a balanced lever system. Because of high gain in the balancing system, the rotary movement is limited to a very small value so that rotary deflection stress is largely eliminated. Deflection stress due to lateral movement of the deflection end of the tube is prevented by the expedient of connecting the deflection end of the tube to the balance lever at the rotation axis which is collinear with that of the tube. Thus, only rotary movement or torque of the tube is transmitted to the balance lever and any lateral movements either in the direction of the tube axis or perpendicular thereto are restrained. Measurement of the force motor current and torque provides an indication of the pressure to be measure.

In the event of overpressure, stops limit movement of the balance lever beyond the measurement range. Thus, excessive deflection and stress of the tube are prevented, thereby preventing overpressure damage to the transducer.

For differential or absolute pressure measurement, a second Bourdon tube arranged to provide a torque opposing that of the first Bourdon tube is used. In that case, the axes of both tubes and the balance lever are collinear.

For a better understanding of the invention, reference should be made to the following detailed description taken in connection with the accompanying drawings.

DESCRIPTION OF THE ILLUSTRATIVE EMBODIMENTS

Figure 1:
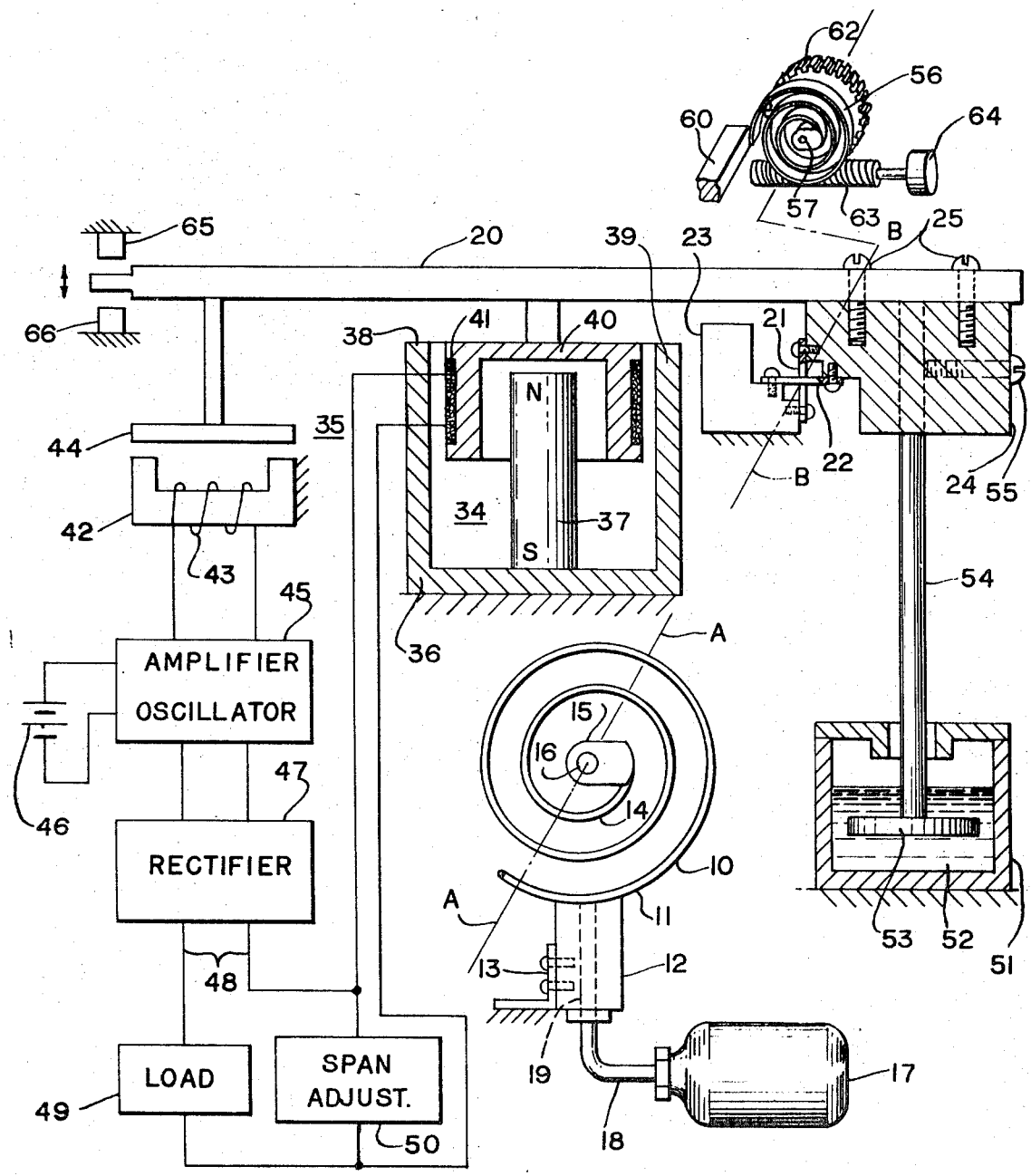
FIG. 1 is a schematic side view, partly in section, of a pressure transducer embodying the invention.

Referring now to FIG. 1 of the drawing, the pressure transducer constructed in accordance with the invention utilizes a Bourdon tube 10 as a pressure sensitive element. The outer end 11 of the tube is mounted on a supporting block 12 and secured thereto in a suitable manner as by brazing. The block is attached to a fixed support by a bracket 13. In the preferred form illustrated, the tube has convolutions in the form of a spiral with respect to the tube axis A—A with an inner end 14 of the tube secured to a central hub 15 in a suitable manner as by brazing. Helical or twisted convolutions may also be used. The hub has a central opening 16 aligned with the tube axis A—A. Pressure to be measured from a source 17 is conducted to the inside of the tube through a conduit 18 and a bore 19 extending through the support block 12 into the tube.

Pressure from source 17 causes an unwinding torque to be exerted on hub 15 about the tube axis A—A that is proportional to the differences in pressure on the inside and outside of the tube. If the outside of tube 10 is exposed to atmospheric pressure, this unwinding torque is a measure of gage pressure of source 17.

If the hub 15 were unrestrained, it would be rotated by the unwinding torque until that torque is counterbalanced by the spring force due to the unwinding of the tube. The spring force depends on the elastic properties of the tube. This tends to be nonlinear due to deflection stress and may result in a permanent set if the elastic limit is exceeded.

According to the invention, a force balance system is provided which restrains movement of the hub 15 to avoid deflection stress and provides means for accurately measuring the unwinding torque which is proportional to the pressure from source 17 to be measured.

The force balance system comprises a balance lever 20 mounted for rotating or pivotal movement about an axis B—B by means of a pair of mutually perpendicular flexures 21 and 22. As shown, the flexures extend between an L-shaped fixed support block 23 and a complementary L-shaped block 24 attached to the end of the lever 20 by screws 25.

Figure 2:
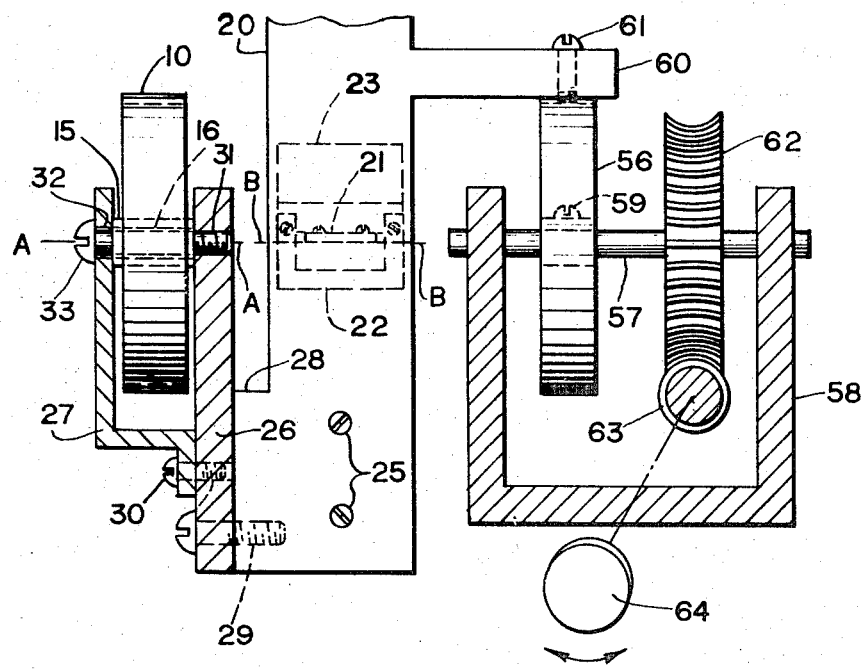
FIG. 2 is a partial top view of the transducer of FIG. 1 showing how the Bourdon tube and zero set spring are attached to the balance lever.

The hub 15 of the Bourdon tube 10 is restrained by connecting it to the balance lever 20 in a manner shown in FIG. 2. The hub is mounted between two brackets 26 and 27 supported on a lateral extension 28 of lever 20 by screws 29 and 30. The bracket 26 has a threaded opening 31 and the bracket 27 an opening 32 receiving a fastening bolt 33 passing through the central opening 16 in hub 15 and securely clamping the hub between brackets 26 and 27. It will be noted that the axis A—A of tube 10 and hub 15 are collinear with respect to the pivot axis B—B of the balance lever 20. Thus, an unwinding torque in tube 10 occasioned by an increase in the pressure of source 17 causes a clockwise torque, as viewed in FIG. 1, to be applied to balance lever 20 about the pivot axis B—B. Any lateral force on hub 15, either along axis A—A or perpendicular thereto, is restrained by the flexures 21 and 22 so that no torques are created thereby.

Torque applied to the balance lever 20 by tube 10 is counterbalanced by a suitable servo motor system. The system comprises a force motor 34, a position detector 35 and associated electrical control apparatus.

The force motor 34 is an electromagnetic motor comprising a fixed cylindrical core structure 36 supporting a cylindrical permanent magnet 37 polarized along its length, as shown, so as to provide a radial magnetic flux extending between the magnet and the oppositely disposed pole pieces 38 and 39 which lie in spaced relation with the magnet. The motor has a movable armature 40 carrying an annular winding 41 disposed in the path of the radial flux provided by magnet 37. When unidirectional electric current is supplied to the winding 41, the magnetic force produced by the winding and the permanent magnet 37 acts to draw the armature down and toward the permanent magnet with a force proportional to the armature current. the armature 44 of the position detector is changed, as from the pivot axis B—B of the lever so that when the force motor armature is energized, a torque or moment is applied to the lever in a counterclockwise direction which counterbalances the torque applied thereto by the Bourdon tube 10.

The amount of current supplied to the force motor is controlled by the position detector 35, the movable part of which is mounted on the outer end of lever 20 so as to sense the position of the lever. While different types of position detectors may be used, the variable inductance type illustrated comprises a fixed U-shaped core carrying a winding 43 the inductance of which is varied by the position of an armature 44 formed of ferrite or other similar material, the movable armature being connected to and positioned by the lever 20. When the position of the armature 44 of the position detector is charged, as by movement of lever 20, the resulting change in inductance of coil 43 changes the amplitude of oscillation of an oscillator 45 in a known manner to which it is connected, the oscillator and an associated amplifier being energized by a suitable power supply 46. The amplified output of the oscillator 45 is fed to a rectifier 47 of known construction, the direct current output of which is connected to a motor energizing circuit 48 which supplies current to the series-connected armature coil 41 of the force motor 34. As shown in FIG. 1 of the drawing, the motor-energizing circuit includes in series-circuit relation with the output of rectifier 47 a load device 49 and the armature winding 41 of the force motor, the current in the circuit being proportional to the force exerted on lever 20 by the force motor. When the lever system is in a state of balance, this force is directly related to the unwinding torque exerted by the Bourdon tube 10 so that the current in the circuit is directly proportional to the pressure being measured and becomes an indication of that quantity. Since the same current flows through the load device 49, it, too, is actuated in accordance with the measured pressure. The load device 49 may be an electric current meter to indicate the measured pressure, or it may be the actuating element of a recorder or a control device used to control the pressure being measured as in an industrial process control system. It will be understood that any pressure change as indicated by a change in torque exerted on lever 20 by Bourdon tube 10 will cause a movement of the armature 44 of the position detector, which, in turn, changes the current supplied to the force motor in a proper direction to restore the lever system to a state of balance.

Preferably, a pressure span adjustment device 50 is connected in shunt with the force motor winding 41 which may be a series of parallel connected switches and calibrated impedances similar to those disclosed in U.S. Pats. 3,342,072 Trekell and 3,350,945 Bristol assigned to the same assignee as the present invention.

In actual practice, the motion of lever 20 in the normal operating range is preferably small, for example, of the order of 0.001 inch at the outer end, to minimize the angular displacement and hence deflection stress, of the inner end 14 of Bourdon tube 10. This requires a high gain servo system which is preferably damped to prevent oscillation. For damping of the system, there is provided a fixed dashpot 51 containing a damping liquid 52, such as a high viscosity silicone oil, surrounding a damping vane 53. The vane is connected to the right-hand end (as viewed in FIG. 1) of lever 20 by a shaft 54 secured in a vertical hole in block 24 by means of a set screw 55.

It will be understood that the lever 20 and the movable components described above connected thereto are statically balanced about the pivot axis B—B. To reduce size, the supporting block 24 may conveniently be dimensioned to act as a counterweight to balance the lever system.

To provide a zero set adjustment for the pressure transducer, a spiral spring 56 is supported on a shaft 57 rotatably mounted on a fixed U-shaped bracket 58 so that the shaft is aligned with the pivot axis B—B of lever 20. The inner end of the spring is attached to the shaft by a screw 59 and the outer end is connected to an arm 60 laterally extending from lever 20 by a screw 61. By rotating a gear 62 secured to shaft 57 through a meshing worm gear 63 driven by a manual set knob 64, positive or negative zero-set torque is introduced into the balance lever system.

Rotation of balance lever 20 beyond its normal operating range is prevented by fixed stops 65 and 66 located on opposite sides of the outer end of the lever. The spacing between the stops is made slightly greater than the normal movement of the lever. Thus, if the normal movement of the lever is 0.001 inch, the stops might be spaced, for example, at 0.002 inch to 0.003 inch. In the event of a substantial overpressure or underpressure, the stops are engaged thus precluding more than a very small rotary movement of the hub 15 of Bourdon tube 10. This prevents deflection stress of the tube that might otherwise adversely affect the zero point or span current calibration of the transducer.

Figure 3:
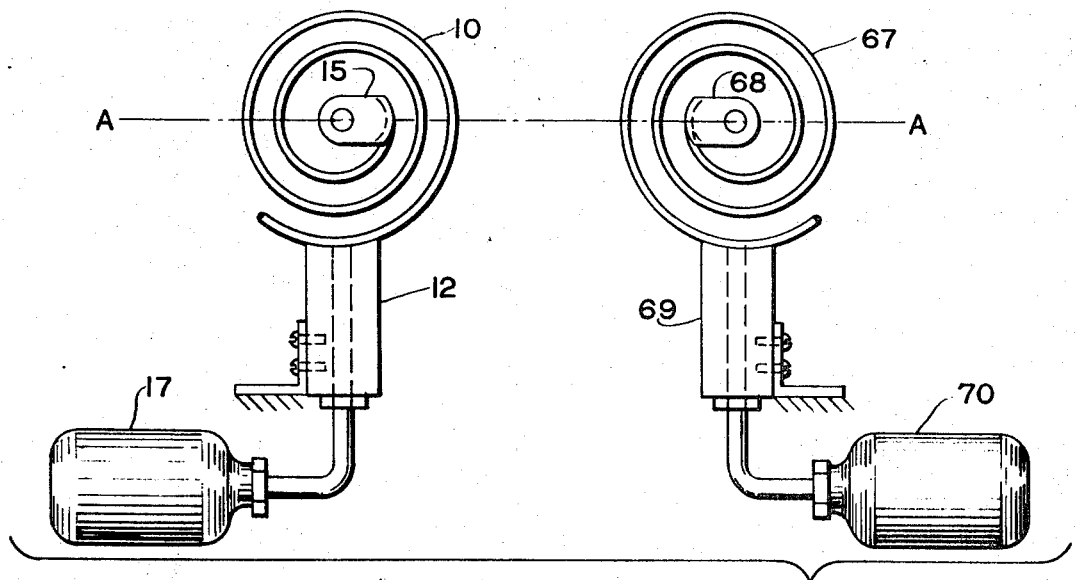
FIG. 3 illustrates how two opposed Bourdon tubes may be used to measure differential or absolute pressure.
Figure 4:
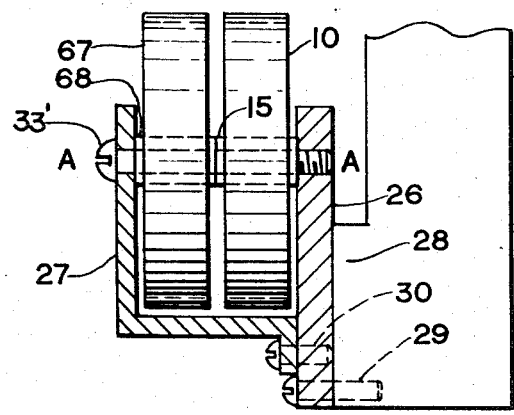
FIG. 4 shows how the two Bourdon tubes of FIG. 3 are attached to the balance lever.

If it is desired to have the transducer respond to a pressure differential, the apparatus shown in FIGS. 1 and 2 may be easily modified by the addition of another Bourdon tube as illustrated in FIGS. 3 and 4. A second Bourdon tube 67 similar to tube 10 has its inner end fastened to a central hub 68 and its outer end mounted on a fixed support block 69, the tube being connected to a second pressure source 70. The tubes 10 and 67 are mounted side-by-side with their central hubs 15 and 68 abutting and held in position by screw 33' between the supporting brackets 26 and 27'. The tubes are mounted so that their convolutions wind in opposite directions as shown in FIG. 3. With this arrangement, the net torque applied to lever 20 about the pivot axis B—B varies in accordance with the difference in the pressures of source 17 and 70, and this is measured by the balance current supplied to load 49. Absolute pressure may be measured by evacuating and sealing the second tube 67 as will be understood by those skilled in the art.

Experimentation has shown that the unwinding torque developed by a Bourdon tube subjected to internal pressure varies linearly with the applied pressure and is substantially independent of the stiffness of the material of which the tube is made. By preventing lateral displacement of the deflection end of the tube and by limiting rotary displacement to a very small amount required for torque balancing by a force motor, errors due to elastic nonlinearity are essentially eliminated. As a result, a pressure responsive device is provided having a higher degree of linearity, accuracy and repeatability in performance than has been possible heretofore. Also, because the pressure sensitive Bourdon tube or tubes and the zero set spring are symmetrically disposed with respect to the pivot axis B—B of balance lever 20, the device is not sensitive to linear acceleration forces that might otherwise produce extraneous torques causing measurement error. Further, any temperature changes tending to cause lateral displacement of the deflection end of the tube do not cause error torques because of the mechanical restraints in the mounting system described above. The device has a still further advantage that the Bourdon tube or tubes may be easily removed for service or replacement by removing fastening screw 33.

Temperature errors may be reduced by preloading the Bourdon tube. This may easily be done by loosening screw 33, displacing the tube slightly from a neutral position in the proper direction and then tightening the screw. The bracket 27 in FIG. 2 or 27' in FIG. 4 prevents the preload adjustment from being changed by friction torque from the head of screw 33 when the screw is tightened.

While there have been shown what are presently considered to be preferred embodiments of the invention, it will be apparent to those skilled in the art that various changes and modifications may be made without departing from the spirit and scope of the invention.

What is claimed as new and desired to be secured by Letters Patent of the United States is:

1. A pressure transducer for producing an output signal proportional to an input pressure provided by a pressure source comprising:
   (a) a Bourdon tube adapted to be connected to said source at one end;
   (b) a balance lever mounted for rotation about an axis;
   (c) a hub member connected to said balance lever for rotation about said axis;
   (d) means for fixedly mounting said one end of said tube at its point of connection to the pressure source and means for connecting the other end of said tube to said hub member, whereby an input pressure at said one end creates a torque tending to rotate the hub member and balance lever about said axis;
   (e) a current source;
   (f) position responsive means for varying the current provided by said current source as a function of the position of said balance lever;
   (g) an electromagnetic force motor connected to said balance lever and to the output of said current source, said force motor being adapted to exert a countertorque on said balance lever as a function of the magnitude of current provided by said current source to normally maintain said balance lever in a balanced position; and
   (h) output means connected in series with said current source and said force motor.

2. A pressure transducer as recited in claim 1 wherein the Bourdon tube is symmetrically coiled with respect to the axis of the tube.

3. A pressure transducer as recited in claim 1 wherein the Bourdon tube is spirally coiled with respect to the axis of the tube.

4. A pressure transducer as recited in claim 3 including stop means limiting rotation of the balance lever when the torque exerted on the lever exceeds the maximum countertorque exerted by the force motor.

5. A pressure transducer as recited in claim 4 including damping means coupled to the balance lever to prevent oscillation thereof.

6. A pressure transducer as recited in claim 5 including zero-set spring means exerting an adjustable torque on the balance lever about its axis.

7. A differential pressure transducer for producing an output signal proportional to the differences in pressures provided by first and second pressure sources comprising:
   (a) first and second Bourdon tubes wound spirally in opposite directions with respect to a common axis, each of said tubes having inner and outer ends at different radial distances from said common axis;
   (b) a balance lever mounted for rotation about the common axis;
   (c) means for fixedly mounting said outer ends of said tubes at their points of connection to the first and second pressure sources;
   (d) a hub member connected to said balance lever for rotation about the common axis;
   (e) means for securing the inner ends of said Bourdon tubes to said hub member, whereby pressures at the outer ends of said tubes creates a torque proportional to the difference in pressures tending to rotate the hub member and balance lever about the common axis;
   (f) a current source;
   (g) position responsive means for varying the current provided by said current source as a function of the position of said balance lever;
   (h) an electromagnetic force motor connected to said balance lever and to the output of said current source, said force motor being adapted to exert a countertorque on said balance lever as a function of the magnitude of current provided by said current source to normally maintain said balance lever in a balance position; and
   (i) output means connected in series with said current source and said force motor.

8. A differential pressure transducer as recited in claim 7 including a zero-set spring means exerting an adjustable balance torque on the balance lever about its axis.

9. A differential pressure transducer as recited in claim 8 including stop means limiting rotation of the balance lever and damping means coupled to the balance lever to prevent oscillation thereof.

References Cited

UNITED STATES PATENTS

| | | | |
|---|---|---|---|
| 2,112,682 | 3/1938 | Ryder | 73—411X |
| 2,847,625 | 8/1958 | Popowsky | 73—398X |
| 3,045,489 | 7/1962 | Brant | 73—398X |
| 3,095,745 | 7/1963 | Kirwan | 73—412 |
| 3,297,045 | 1/1967 | Beach et al. | 73—407X |
| 3,455,166 | 7/1969 | Gineste | 73—398 |

FOREIGN PATENTS

| | | | |
|---|---|---|---|
| 1,552,447 | 11/1968 | France | 73—412 |

LOUIS R. PRINCE, Primary Examiner

D. M. YASICH, Assistant Examiner

U.S. Cl. X.R.

73—412